United States Patent Office 3,770,687
Patented Nov. 6, 1973

---

3,770,687
CONTROLLED RELEASE COATING COMPOSITION AND PROCESS
Thomas S. Mestetsky, Easton, Pa., assignor to GAF Corporation, New York, N.Y.
No Drawing. Filed July 27, 1971, Ser. No. 166,568
Int. Cl. C08f *35/02;* C08g *51/26*
U.S. Cl. 260—30.4 SB          8 Claims

ABSTRACT OF THE DISCLOSURE

A controlled release coating composition comprising an organic solvent solution of an organopolysiloxane and a solvent soluble polymer of a polymerizable unsaturated aliphatic dibasic acid or derivative thereof. Incremental changes in the proportion of said solvent soluble polymer lead to incremental changes in the release force of the coatings produced with such compositions. Processes for applying the new coating compositions are also described. A typical composition comprises a toluene solution of a polymethylsiloxane and a $C_{18}$ alkyl vinyl ether/maleic anhydride copolymer in a 10:1 ratio on a weight basis.

---

The present invention relates to novel polysiloxane controlled release compositions and to the use of such compositions.

Controlled release coatings are coatings which are applied to a substrate to prevent or decrease the adhesion of another substance to it. Controlled release is a measure of the degree of adhesion which a sticky or tacky substance displays towards an adhesive coating. Controlled release coatings are widely used as mold release agents, as pressure sensitive label backings and as coatings for containers to facilitate removal of the contents thereof.

Silicone resins have been employed widely as release coatings notwithstanding their high cost because they are capable of providing excellent release properties. For some uses, however, their release capabilities are too great. For example, in pressure sensitive tape use, the tape must be easily separated from the backing, but the backing must be sufficiently adherent to prevent it from accidentally falling off or sliding away, an occurrence which is not too infrequent in practice. Agents are known which effectively reduce the release properties of the silicones. However, one difficulty with most such agents is that they are too effective; and when added to silicone release compositions, in even small amounts, they produce quite a large reduction in release properties. For example, addition of about 20% by weight of a known commercially available controlled release agent to a commercially available silicone release coating, leads to about a 100% increase in release force. The direct disadvantage of this disproportionate effect is that small changes in release properties cannot be readily obtained. Indirectly, this is commercially disadvantageous because it means that high cost silicone release compositions cannot be diluted with significant percentages of less costly materials without trading off too much of the inherent release properties of the silicones.

It is an object of the present invention to provide silicone controlled release compositions with varying release capabilities to suit varying release requirements.

It is another object of this invention to provide silicone release compositions which contain relatively large amounts of relatively low-cost release control additives while retaining relatively high release values.

Other objects of this invention will be apparent from the following description.

It has been discovered, in accordance with the present invention, that an effective controlled release coating composition is provided by an organic solvent solution of a solvent soluble polysiloxane and a polymer of a polymerizable unsaturated aliphatic dibasic acid or anhydride, ester, amide or imide derivative, e.g., a polymer of maleic anhydride, acid, ester, amide and/or imide. Unlike most other additive polymers, small proportions of such polymers, e.g., maleic polymers, do not cause large reductions in release properties of silicone polymers. Thus, marked effects on release properties do not follow small changes in additive polymer concentrations, and precise control is more readily achieved. Advantageously also, larger amounts of polymers of unsaturated aliphatic dibasic acids and derivatives thereof can be used to obtain desired release values than other additive polymers, so that less costly silicone controlled release compositions are made available by this invention.

The solvent soluble polymers of unsaturated aliphatic dibasic acids and derivatives thereof used in the composition of the present invention to increase the release force of silicone polymers should contain at least 15 mole percent of recurring units of the following Formula I:

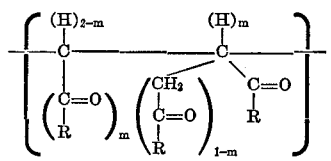

wherein R is individually OR′ or N(R″)$_2$, R′ being hydrogen, a metal, ammonium or amine cation, or a hydrocarbon moiety free of olefinic unsaturation, or the R's taken together form an oxa or imide linkage; R″ is hydrogen or alkyl, at least one of said R′ and R″ being a non-olefinic hydrocarbon moiety of at least 4, preferably at least 8 and more preferably at least 12 carbon atoms; and $m$ is either 0 or 1.

As is known, homopolymers of maleic anhydride and derivatives can be prepared by the polymerization of maleic anhydride or its derivatives, or by homopolymerization of maleic anhydrides followed by the optional treatment of the resultant maleic homopolymers with esterification or addition reagents to convert the anhydride groups to groups containing hydrocarbon radicals of at least 4 carbon atoms. For example, maleic anhydride can be homopolymerized to poly(maleic anhydride) and the poly(maleic anhydride) then treated with any one of several reagents which convert the anhydride ring to pendant carboxy or amido groups containing the necessary solvent solubilizing hydrocarbon radicals. Thus, poly (maleic anhydride) can be treated with ammonia under conditions leading to the production of either poly(maleamic acid ammonium salt) or poly-(maleamide) or poly(maleic imide). Either derivative can be converted by known hydrolysis, esterification and/or alkylation procedures to polymers having pendant hydrocarbon moieties of at least 4 carbon atoms. Alternatively, the poly(maleic anhydride) can be treated with water to produce poly(maleic acid) or with inorganic or organic bases to produce metal, ammonium or amine salts of poly-(maleic acid). These salts can be converted by esterification and/or alkylation reactions to the desired polymer having pendant hydrocarbon moieties of at least 4 carbon atoms.

Polymers having the recurring units represented by Formula I can alternatively be prepared by copolymerization of maleic, fumaric or itaconic acids or amide, anhydried, imide, ester and/or salt derivatives thereof with each other and/or with other copolymerizable vinyl monomers. The pendant hydrocarbon moieties necessary to impart solvent solubility to the polymers may be introduced to the polymer through the copolymerizable vinyl monomer, or the copolymerizable unsaturated aliphatic dibasic acid derivative or by after-treatment of the polymer with a reagent which introduces the hydrocarbon moiety to the recurring unit derived from the polymerizable unsaturated aliphatic dibasic acid monomer.

The polymerization of the monomers useful in preparing the homo- or co-polymers having the recurring units of Formula I and another monomer containing a $CH_2=C<$ group, can be carried out by conventional procedures such as those disclosed in U.S. Pat. 2,047,398. The proportion of the unsaturated aliphatic dibasic acid or derivative thereof in the polymerizable mix should be at least about 15 mole percent in order that the resultant polymer has 15 mole percent of recurring units represented by Formula I. The polymerization should be conducted under conditions such that the resultant polymers have a relative viscosity of at least 0.1 which corresponds to a molecular weight of about 10,000. Preferably the polymer should have a molecular weight below 2 million, although polymers with higher molecular weights can be employed.

Vinyl monomers which can be copolymerized with monomeric unsaturated aliphatic dibasic acids or derivatives thereof to produce polymers having recurring units shown by Formula I can be selected from vinyl esters of long chain saturated monocarboxylic acids (e.g., vinyl stearate); vinyl aromatic compounds (e.g., styrene and its alkyl substituted homologues); $C_4$–$C_{22}$-alkyl vinyl ethers (e.g., octyle vinyl ether, stearyl vinyl and the like); $C_4$–$C_{22}$ alkyl acrylates and methacrylates (e.g., dodecyl acrylate, tetradecyl acrylate, octodecyl methacrylate, and the like).

It should be noted that when the moiety of the unsaturated aliphatic dibasic acid itself contains a long chain hydrocarbon group, then the vinyl comonomer which may be used therewith may, or may not, as desired, contain a long chain hydrocarbon group. Similarly a copolymer of unsaturated aliphatic dibasic acid or derivate thereof and a vinyl comonomer, neither of which contain a long chain hydrocarbon group, can be converted to one which does by treatment with a reagent which through an esterification and/or an addition reaction adds such a group onto pendant reactive groups of the monomer. For example, a copolymer of maleic anhydride and a vinyl lower alkyl ether can be treated with a $C_4$–$C_{22}$ alcohol which, by esterification, adds the $C_4$–$C_{22}$ long chain hydrocarbon group to the pendant carboxy groups of the polymer. Likewise a polymer of an amide of an unsaturated aliphatic dibasic acid and a lower alkyl vinyl ether can be converted to a polymer having pendant long chain hydrocarbon groups by treatment of the polymer with a long chain alkylating agent such as a $C_4$–$C_{22}$ alkyl bromide or chloride, preferably in the presence of a hydrogen halide exceptor.

Other monomers such as vinyl halides, vinylidene halides, olefins, styrenes and other monomers suggested in U.S. Pat. 2,047,398 may be copolymerized with the unsaturated aliphatic dibasic acids or derivatives to produce useful polymerization.

Of the unsaturated aliphatic dibasic acids and derivatives which can be used in the preparation of the solvent soluble polymers required by the present invention, polymers of maleic acid, anhydride, amide, esters and/or imides are preferred, with maleic acid anhydride being most preferred because of the ease with which it can be polymerized. The maleic polymers useful in the present invention should have a relative viscosity of at least 0.1 and contain at least about 15 mole percent and preferably at least 30 mole percent of the unit (II):

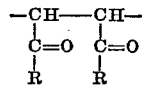

wherein each R is OR' or $N(R'')_2$, R' being individually H, $C_1$–$C_{22}$ alkyl (e.g., methyl propyl, octyl, stearyl, etc.), aryl (e.g., phenyl, xylyl, etc.), or alkaryl (e.g., phenethyl or benzyl), or an amine, metal or ammonium cation, or the two R groups taken together form an oxa or imide group, R" being hydrogen or a nonolefinic hydrocarbon moiety, with the remaining units being recurring units of the Formula III:

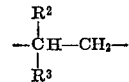

wherein $R^2$ is hydrogen or methyl and $R^3$ is COOR', OR', CN, aryl, aralkyl or halo, provided that at least one of the R and $R^3$ moities in said units comprises a $C_4$–$C_{22}$ hydrocarbon radical.

The organosiloxane resin employed as the silicone component of the compositions of this invention are known polymeric materials prepared and curable by methods well known in the art. Any solvent soluble polysiloxane release agent, such as methylhydrogen polysiloxane or trimethyl end-blocked dimethylpolysiloxane fluids or combinations thereof, as well as mixtures of hydroxylated dimethylpolysiloxanes and methylhydrogen polysiloxanes may be used. Further types of useful organopolysiloxanes and method of preparing and curing are disclosed in U.S. Pats. 3,050,411 and 3,061,567 and British Pat. 882,378. The preferred silicone polymers should have a molecular weight in the range of about 800–2000, although polymers with molecular weights outside of this range are operative.

Use of a catalyst is optional but preferred because it materially increases the rate of curing. Typical catalysts are metal carboxylates such as dibutyltin dioctoate, lead octoate, dibutyltin diacetate, dibutyltin dilaurate, zinc octoate, ferric octoate, ferric naphthenate, cobalt naphthenate, tin octoate, tin naphthenate, tin oleate, butyltin trioctoate and the like, generally employed in weight ratios of about 0.1 to 100 parts per 100 parts of silicone. A useful commercially available system is that of Dow Corning Chemical Co. comprising Syl-Off 23 polysiloxane solution (30% active in xylene, 10,000 to 25,000 centistokes at 77° F.) and Catalyst 23a organometallic salt solution (50% active in xylene).

Organic solvents useful for preparing the polymer solution of this invention illustrativley include aliphatic hydrocarbons (e.g., hexane), dioxane, tetrahydrofuran, dimethylformamide, butyrolactone, N-methylpyrrolidone, dimethylsulfoxide and preferably aromatic hydrocarbons such as toluene and xylene. Polar solvents are preferred, though non-polar ones are operative.

The ratio of polysiloxane to unsaturated dibasic acid polymer will determine the release properties of the resulting coating. The more unsaturated dibasic acid polymer present, the greater is the force required to release an adhesive surface from the resultant coating. In general, the organopolysiloxane resin should comprise by weight at least about 5% and preferably at least about 40% of the resin content of the coating composition. Since the change in release force is relatively proportionate to the change in unsaturated dibasic acid polymer content of the coating composition, release force of the coating composition can be precisely adjusted by incremental changes in said polymer content of the coating composition. Even relatively large amounts of unsaturated dibasic acid polymer (e.g., about 50% of the resin content of the coating composition) result in only about a 50% increase in the force required to remove an adhesive from the controlled release coating. Thus, it is feasible and practical to use controlled release coating compositions containing between 5 and 95 weight percent of the unsaturated dibasic acid polymer based upon the total resin content of the controlled release coating composition. The total amount of resin in the in the controlled release coating composition, on a weight basic, can vary in the range of 0.5 to 50%. The only requirement is that the solution be of sufficient concentration to form a substantially continuous coating on the surface to which it is applied after the solvent has been evaporated. The thickness of the coating is not critical, so long as it is substantially a continuous coating. Generally, coatings having a weight in the range of 0.1 to 1.0 lb. coating/

3000 ft.$^2$, preferably 0.2 to 0.7 lb./3000 ft.$^2$ are useful for most purposes.

The coating compositions of the present invention in addition to the silicone, unsaturated dibasic acid polymers and the curing catalyst for the silicone may further contain, if desired, conventional auxiliary agents such as thickening agents and additives. Thickening agents may be added to these compositions in order to adjust their viscosities to the requirement of the equipment used to apply the coating composition and to regulate coating pickup and holdout. Likewise, the use of such conventional additives as plasticizers and the like is also permissible.

The release coating compositions of the present invention may be applied to a surface by conventional air knife, trailing blade, roll, spraying, printing or casting methods. The coated substrate is then subjected to curing treatment which generally involves subjecting the surface to heat for a short period of time. Curing may be effected by heating the coated surface for about 0.1 to 3 minutes at about 200° F. to 450° F. Curing can be accelerated or decelerated by increasing or decreasing the catalyst concentration respectively. Or course, as is well known, curing can also be effected at room temperature although this approach requires a relatively great amount of time.

The controlled release coating compositions of the present invention can be applied to a wide variety of surfaces to take advantage of their release properties. They can be used as mold release agents on bakery pans and candy trays. Likewise, they can be used on paper, plastics and metal foils to provide release coatings when these materials are made into containers for such products as asphalt, wax, resin and the like. They can also be used to coat multiwall bags and cartons which will contain rubber and to coat cartons which will contain candy, baked goods and other sticky products. They are also useful to coat backing sheets for pressure sensitive tapes, labels, tags, decals, self-bonding wall paper, decorative plastics and asphalt impregnated pipe wrapping. Thus, in general they can be used to coat any type of material such as the cellulosics (e.g., bleach sulfate, clay coated kraft, glassine, parchment, tissue and the like) and plastics such as nylon, polyacrylonitrile, polyesters, styrene, vinyl plastics, polyurethanes and other organic resin materials. Moreover, they are also applicable to inorganic materials such as ceramics or metals such as aluminum, magnesium, copper, steel or zinc.

The following examples are presented to further illustrate the present invention. All parts and proportions refered to herein and in the appended claims are by weight unless otherwise indicated.

EXAMPLE 1

A mixture of 16.7 parts of polymethylsiloxane organic solvent solution (30% in xylene) and 0.3 part of dibutyltin dioctoate catalyst solution (50% in xylene) in sufficient toluene to give a 5% solids content, is prepared. The mixture is coated on a 25 lb./3000 square feet glassine sheet at 0.5 mil wet thickness, dried and tested for release properties by the following procedure. The adhesive surface of 1" wide Johnson & Johnson red cross tape is applied to the release coated surface using a 4.4 lb. rubber covered roller. Three such tape-release coated laminates are placed in a Carver laboratory press (using 6" platens) and subjected to a pressure of 2100 lbs. for 15 minutes. The laminates are then pulled apart in T-peel using a pendulum type tensile tester made by Suter-Manuftcturing Company of Brooklyn, N.Y., at a separation speed of 12" per minute. The force required to delaminate this coating, i.e., to pull the adhesive tape from the silicone polymer surface, is 0.073 lb. per inch of tape width.

EXAMPLE 2

The procedure of Example 1 is repeated except that 1.67 parts of a 40% solution in toluene of an alkyl vinyl ether/maleic anhydride copolymer in which the alkyl vinyl ether mixture (63–66% of $C_{18}$ alkyl, 25–30% of $C_{16}$ alkyl, 4–6% of $C_{14}$ alkyl, 2–3% of $C_{12}$ alkyl and 0.3% of $C_{10}$ alkyl vinyl ethers) is copolymerized with an equimolar amount of maleic anhydride, is added to the 5% solids polysiloxane solution. The mixture is coated and tested by the procedure described in Example 1. The force to delaminate this coating is 0.08 lb. per inch of tape width. The tackiness of the adhesive surface of the tape before and after contact with the controlled release surface is the same.

EXAMPLE 3

A series of formulations are prepared containing various ratios of the polymethylsiloxane solution employed in Example 1 with (A) a 40% solution in toluene of an alkyl vinyl ether/maleic anhydride copolymer in which the alkyl vinyl ether mixture (96% $C_{18}$ alkyl, 2% $C_{16}$ alkyl, and 2% $C_{14-10}$ alkyl vinyl ethers) is copolymerized with an equimolar amount of maleic anhydride, and for comparison, (B) a commerical controlled release additive, Dow Corning C-42019, and (C) Gantrez M-555 (GAF Corporation vinylmethyl ether homopolymer). All formulations contained 4% of the catalyst solution employed in Example 1 based on the weight of the polymethyl-siloxane solution, and were diluted with methylethyl ketone to 5% total solids content. Coatings were prepared, tested in the manner described in Example 1, and the results reported in Table 1 below.

TABLE 1

| | Release force (grams/inch width) | | |
|---|---|---|---|
| | With (C) | With (B) | With (A) |
| Percent silicone: | | | |
| 100 | 50 | 50 | 50 |
| 80 | 250 | 100 | 60 |
| 70 | 350 | 150 | 70 |
| 50 | 550 | 225 | 80 |

From the foregoing data, it is evident that addition of the methylvinyl ether homopolymer to a silicone release composition, even in relatively small amounts, drastically increases the force required to release an adhesive from the coating. Likewise, the addition of the commercially available controlled release agent to silicon effects a marked increase in the force required to release an adhesive from the release-coated surface. Only the silicone-maleic anhydride copolymer (A) composition shows a substantially small and proportionate change in release force for incremental changes in the proportion of maleic polymer in the formulation.

This invention has been disclosed with respect to certain preferred embodiments, and it will be understood that modifications and variations thereof will become obvious to persons skilled in the art and are intended to be included within the spirit and purview of this application and the scope of the appended claims.

What is claimed is:

1. A controlled self-release coating composition comprising an organic solvent solution containing 0.5 to 50 weight percent of a resin mixture comprising, by weight:
   (a) 5 to 95 percent of a solvent soluble polyorganosiloxane anti-stick release polymer, and
   (b) 5 to 95 percent of an organic solvent soluble polymer having a relative viscosity of at least 0.1 and containing at least 15 mole percent of recurring units of the following formula:

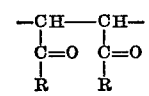

wherein each R is OR' or N(R")$_2$, R' being individually H, $C_1$–$C_{22}$ alkyl, aryl, alkaryl, amine, metal or ammonium cation, or the two R groups taken together form an oxa or imide group, R" being hydrogen or a non-olefinic hydrocarbon moiety of at least 4 carbon atoms, with the remaining units being recurring units of the formula:

(II) 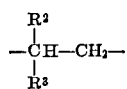

wherein $R^2$ is hydrogen or methyl and $R^3$ is COOR', OR', CN, aryl, aralkyl or halo, provided that at least one of the R and $R^3$ moieties in said units comprises a $C_4$–$C_{22}$ hydrocarbon radical, said polyorganosiloxane polymer being operative to impart self-releasing properties and a non-adherent surface.

2. The composition of claim 1 wherein the solvent is an aromatic hydrocarbon, an aliphatic hydrocarbon, dimethylformamide, butyrolactone, tetrahydrofuran, dimethylsulfoxide or dioxane.

3. The composition of claim 1 wherein the solvent is a polar aromatic hydrocarbon.

4. The composition of claim 1 wherein the solvent is toluene.

5. The composition of claim 1 wherein the polysiloxane polymer is methyl hydrogen polysiloxane, trimethyl end-blocked dimethyl polysiloxane fluids, mixtures of hydroxylated dimethyl-polysiloxanes and methyl hydrogen polysiloxanes, or combinations thereof.

6. The coating composition of claim 1 wherein $m$ is 1 and the recurring units are derived from a homopolymer of maleic anhydride, maleic acid, maleic imide, maleic amide or a partial ester thereof.

7. The composition of claim 1 wherein the said polymer is the copolymer of 50% of a $C_{18}$ alkyl vinyl ether and 50% maleic anhydride.

8. The composition of claim 1 wherein the pendant hydrocarbon moiety is an alkyl moiety having more than about 8 carbon atoms.

References Cited

UNITED STATES PATENTS

| | | | |
|---|---|---|---|
| 3,261,881 | 7/1966 | Christenson et al. | 260—827 X |
| 3,328,482 | 6/1967 | Northup et al. | 260—827 X |
| 3,436,252 | 4/1969 | Neuroth | 260—827 UX |

LEWIS T. JACOBS, Primary Examiner

U.S. Cl. X.R.

260—30.4 R, 30.8 R, 32.6 R, 33.6 SB, 827